United States Patent [19]
Parish et al.

[11] 3,758,674
[45] Sept. 11, 1973

[54] PROCESS FOR PRODUCING ANHYDROUS HF FROM FLUOSILICIC ACID
[75] Inventors: William R. Parish; James C. Kelley; Albert Giovanetti, all of Lakeland, Fla.; William A. Lutz, Weston, Conn.
[73] Assignee: Wellman-Power Gas Incorporated, Lakeland, Fla.
[22] Filed: Sept. 16, 1971
[21] Appl. No.: 181,187

Related U.S. Application Data
[63] Continuation-in-part of Ser. No. 816,229, April 15, 1969.

[52] U.S. Cl............. 423/483, 423/341, 423/472, 423/488, 423/489
[51] Int. Cl............................................. C01b 7/22
[58] Field of Search............. 23/153, 182 R, 182 V, 23/205; 423/483, 341, 472, 488, 489, 335, 336

[56] References Cited
UNITED STATES PATENTS
| | | | |
|---|---|---|---|
| 1,960,347 | 5/1934 | Osswald | 23/153 |
| 2,456,509 | 12/1948 | Hopkins, Jr. et al. | 23/153 |
| 3,110,562 | 11/1963 | Hinkle, Jr. | 23/153 |
| 3,218,124 | 11/1965 | Oakley, Jr. et al. | 23/153 |
| 3,218,126 | 11/1965 | Wilkinson | 23/153 |
| 3,218,128 | 11/1965 | Klem | 23/153 |
| 3,218,129 | 11/1965 | Barker et al. | 23/153 |
| 3,233,969 | 2/1966 | Heller et al. | 23/182 |
| 3,273,963 | 9/1966 | Gunn, Jr. | 23/153 X |
| 3,326,634 | 6/1967 | Porter et al. | 23/153 |
| 3,415,039 | 12/1968 | Rushton et al. | 23/153 |
| 3,645,678 | 2/1972 | Parish et al. | 23/182 R X |

OTHER PUBLICATIONS
"Basic College Chemistry," Second Ed., 1953, by Joseph A. Babor, pages 18 and 255–257. Thomas Y. Crowell Co., New York.

Primary Examiner—Edward Stern
Attorney—John W. Behringer et al.

[57] ABSTRACT

Concentrated fluosilicic acid is premixed with concentrated sulfuric acid under superatmospheric pressure in the essential absence of a separate vapor phase. The mixture is introduced to a reduced pressure, high temperature separation zone to release a gaseous overhead mixture of HF and $SiF_4$ and a liquid bottoms of diluted sulfuric acid. The overhead mixture is contacted with cooler concentrated sulfuric acid to selectively absorb the HF. The resulting sulfuric acid is conducted to a desorption zone where it is heated to liberate the absorbed HF. The $SiF_4$ can advantageously be used to concentrate weaker fluosilicic acid feed streams, and silica is made in this reaction. The diluted sulfuric acid bottoms from the separation zone can advantageously be contacted with silica to convert any entrained HF to $SiF_4$ and water.

25 Claims, 1 Drawing Figure

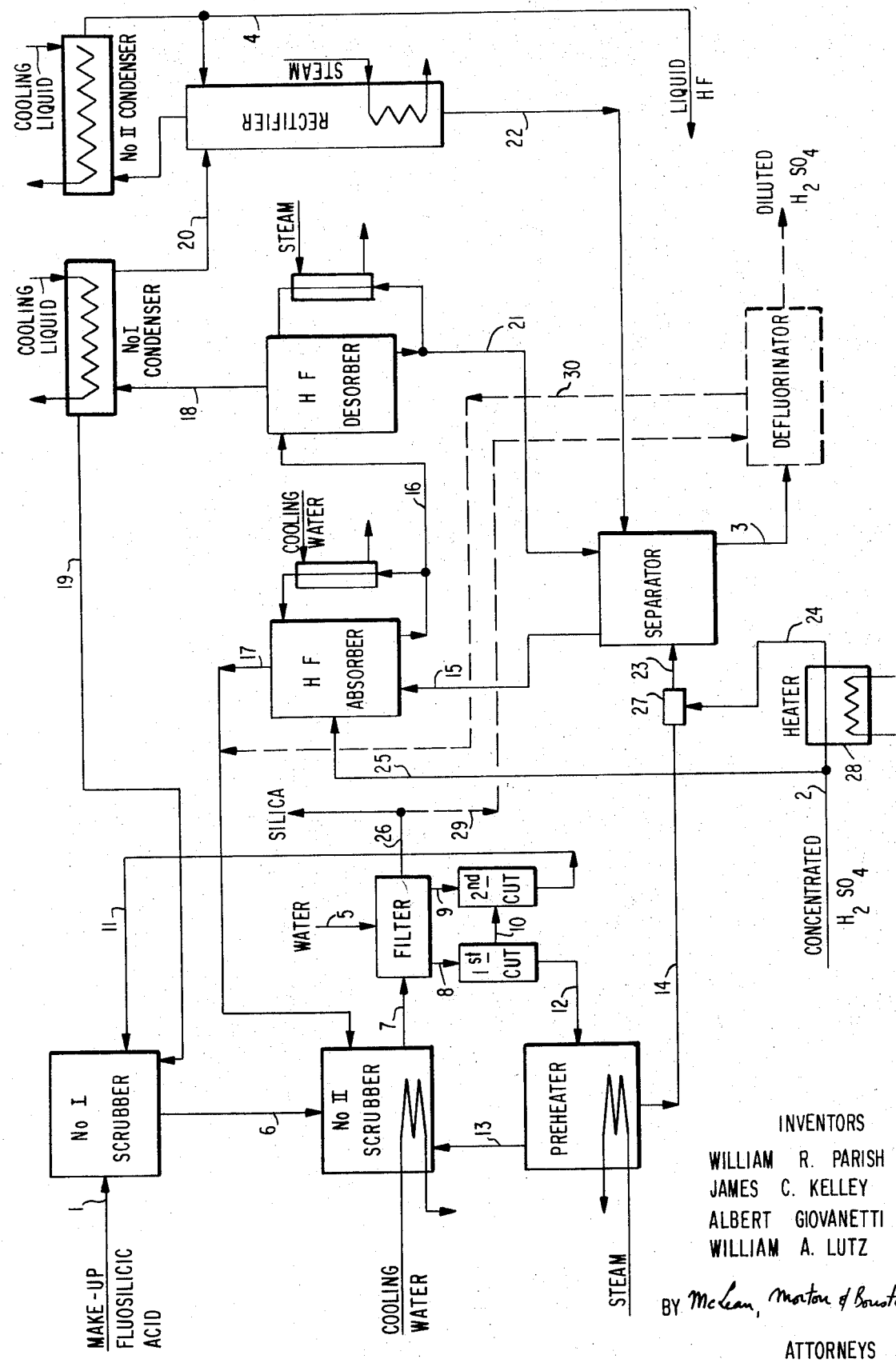

PROCESS FOR PRODUCING ANHYDROUS HF FROM FLUOSILICIC ACID

This application is a continuation-in-part of abandoned application Ser. No. 816,229, filed Apr. 15, 1969. Other applications, commonly owned herewith, concerning processes of treating fluosilicic acid are U. S. Ser. No. 17,580, filed Mar. 9, 1970 (now U. S. Pat. No. 3,645,678), U. S. Ser. No. 17,590, filed Mar. 9, 1970 (now U. S. Pat. No. 3,645,679), and U. S. Ser. No. 17,611, filed Mar. 9, 1970 (now U. S. Pat. No. 3,645,680).

This invention relates to a process using concentrated sulfuric acid to recover anhydrous hydrogen fluoride (HF) from fluosilicic acid. The process returns diluted sulfuric acid and, in an integrated embodiment, silica is also produced.

The process of the present invention involves mixing in a confined zone which does not permit the presence of a separate vapor phase, sulfuric acid having a concentration generally of at least about 93, preferably about 93 or 98 to 99, weight percent with aqueous fluosilicic acid having a composition of at least about 25 weight percent $H_2SiF_6$, preferably about 30 to 50 weight percent $H_2SiF_6$. Such concentrated fluosilicic acids can not readily be made from weaker acids by evaporation of water since azeotrope formation may be encountered before the desired higher acid concentration is reached. The stronger acids can be readily and conveniently prepared in the present invention by combining $SiF_4$ separated in concentrated form in the process with dilute aqueous fluosilicic acid streams which are available. Often these dilute streams contain about 10 to 20 or 25 weight percent, or even about 10 to 15 weight percent fluosilicic acid based on this component and water. The amount of $SiF_4$ so reacted is often sufficient to increase the concentration of fluosilicic acid by at least about 10 weight percent. Representative acids made in this manner may have from about 25 weight percent $H_2SiF_6$ and about 75 weight percent water up to the azeotropic mixture of about 10 weight percent HF, about 36 weight percent $H_2SiF_6$ and about 54 weight percent water. (A ternary phase diagram illustrating this azeotropic composition is presented in the book, "Superphosphate: Its History, Chemistry, and Manufacture," published jointly by the U. S. Department of Agriculture and the Tennessee Valley Authority in December 1965, page 225.)

relatively the fluosilicic acid combined with the sulfuric acid is realtively concentrated, the process of this invention provides considerable savings in sulfuric acid consumption as compared with systems employing more dilute fluosilicic acids for contact with the sulfuric acid. Also, the sulfuric acid consumption can be relatively constant even though the available dilute fluosilicic acid stream varies considerably in concentration. Thus, a fluosilicic acid of given concentration can be made from the various dilute fluosilicic acid feeds by combining a selected amount of $SiF_4$ with the dilute acid before contact with the sulfuric acid. As a result a more easily controlled and stabilized operation is provided.

As used herein, the term "sulfuric acid" is meant to include oleum as well as less concentrated forms of sulfuric acid, and such acids are combined with the concentrated fluorsilicic acid in accordance with the present invention. Preferably, the sulfuric acid is preheated to about 100° to 250°F. and the fluosilicic acid is preheated to about 100°, or even to about 200°, to 240°F. prior to mixing the two together. It is also preferred that the fluosilicic acid be essentially silica-free. The weight ratio (anhydrous basis) in the mixture is generally about 10 to 30 parts, preferably about 15 to 20 parts, sulfuric acid per part of fluosilicic acid.

The mixing of the fluosilicic and sulfuric acids is carried out in the confined zone under superatmospheric pressure and the mixture is maintained thereunder for a time sufficient to allow the temperature of the mixture to reach at least about 220°F., preferably to allow the mixture to reach the temperature of the liquid in the separation zone, which is hereinafter discussed. The time required will often be about 0.1 to 10 seconds or more. Since the two acids are in liquid form and there is essentially no vapor phase separate from the liquid phase, the amount of silica formed from the water and silicic components present is significantly reduced as compared with that resulting from mixing of the acids in a partially filled vessel having a substantial vapor space. If the relatively strong acids used in this invention, which provide a good reaction driving force, are mixed in a free space reaction zone, a violent reaction can take place and give an undesirably large amount of water in the vapor space. The presence of water in such vapor space leads to the formation of undesirably large amounts of silica and accompanying plugging of equipment by the silica. In the present invention, this undesirable result is avoided to great extent by the use of a reaction zone which has essentially no vapor space.

In mixing the fluosilicic and sulfuric acids according to this invention, sufficient pressure is employed to force the acids into the liquid phase reaction zone, and the reaction mixture is manufactured under sufficient superatmospheric pressure to avoid the presence of a significant amount of a separate vapor phase and thereby prevent, at least to a significant extent, the formation of silica from the water and silicic components present. Suitable pressures are, for instance, at least about 5 pounds per square inch gauge (p.s.i.g.), preferably at least about 10 or even 15 p.s.i.g. In a preferred form of the invention, the reaction between the acids takes place in a confined flow line into which the reactants are separately charged and the reaction mixture occupies as a liquid phase essentially all of volume of the line. The reaction may contain a vapor within the liquid phase but there is essentially no vapor phase separate from the liquid reaction mixture.

The pressurized mixture of sulfuric acid and fluosilicic acid is next introduced into a reduced pressure separation zone from whence a mixture of hydrogen fluoride and silicon tetrafluoride is evolved as gaseous overhead and diluted sulfuric acid is withdrawn as liquid bottoms. The temperature of the liquid in the separation zone is maintained at at least about 200°F., preferably at least about 250°F., and below the boiling point of the sulfuric acid in the zone. The pressure in the separation zone is sufficiently below that of the pressurized mixture of acids in the initial reaction zone to allow for the gas-liquid separation. It is often preferred to operate the separation zone at about atmospheric pressure. Due to the nature of the reaction mixture, the vapor phase in the separation vessel is relatively dry and there is, therefore, minimal, if any, formation of silica during the separation.

The separation zone is preferably one which allows for the mixture to be sufficiently dispersed that it has at least about one, preferably at least about 20, or even at least about 40, square centimeters of liquid-gas interface per cubic centimeter of liquid. In other words, the vessel which houses the separation zone is one which provides a large surface area for the liquid, examples of such being spray towers, falling film evaporators, wiped film evaporators, forced circulation evaporators, or any highly agitated vessel. In a falling film evaporator, for instance, there can often be obtained about 20 to 40 square centimeters of liquid-gas interface per cubic centimeter of liquid.

The desired temperature can usually be maintained in the separation zone without the application of external heat. As mentioned above, it is preferred that the entering mixture of acids already be up to the desired separation zone temperatures. One source of heat is that released by the dilution of the concentrated sulfuric acid due to the latter's absorbing water from the fluosilicic acid. By preheating either or both acids and by maintaining them in pressurized admixture with one another for a sufficiently long time, the objective of bringing them up to separation zone temperatures is greatly facilitated.

The residence time of the mixture in the separation zone is preferably relatively short, ranging, for example, from about 0.1 minute to about 80 minutes, preferably about 0.5 to 5 or 20 minutes. The fluosilicic acid is dehydrated during the time beginning with its admixture with the concentrated sulfuric acid and extending to its residence in the separation zone, and the sulfuric acid is correspondingly diluted. HF and $SiF_4$, products of the dehydration of fluosilicic acid, exit the separation zone as substantially anhydrous gaseous overhead. The diluted sulfuric acid is withdrawn from the zone as liquid bottoms, for example, having a concentration of about 65 to 90, often about 75 to 85, weight percent. This concentration can be controlled by controlling the ratio of the sulfuric acid to the fluosilicic acid in the pressurized mixture introduced to the separation zone.

The diluted sulfuric acid will usually contain a very minor amount of HF, say up to about 2 weight percent. In a preferred embodiment of the present invention, this diluted sulfuric acid obtained as bottoms from the separation zone is contacted with silica in a defluorination zone at a temperature below the boiling point of the sulfuric acid in the zone but sufficient to convert any HF present in the acid to water and $SiF_4$ and to evaporate the $SiF_4$ from the acid. The diluted sulfuric acid is preferably sent directly to the defluorination zone from the separation zone, no intermediate heating or cooling being necessary. The amount of silica employed in the defluorination zone is preferably at least about stoichiometric to the amount of HF in the sulfuric acid. As the defluorination proceeds to produce and release gaseous $SiF_4$, it also operates to further dilute the sulfuric acid due to the by-production of water in the zone according to the reaction:

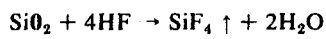

This can be especially advantageous where it is desired to use the sulfuric acid in the wet process of producing phosphoric acid but the concentration as it leaves the separation zone is slightly higher than preferred. The $SiF_4$ vapors from the defluorination zone can advantageously be conducted to a hydration zone, discussed hereinafter, to be converted into fluosilicic acid and silica.

The gaseous overhead from the separation zone is contacted with liquid sulfuric acid having a concentration of at least about 93, preferably about 93 or 98 to 99, weight percent and a temperature up to about 120°F., often about 90° to 100°F., to selectively absorb the HF. Any suitable gas-liquid contacting vessel can be employed, preferably, however, one in which the gaseous overhead is passed upwardly through a descending stream of the concentrated sulfuric acid, e.g., in a packed tower, sieve tray column, bubble capped column, spray tower, etc. $SiF_4$ passes through the sulfuric acid without being absorbed. Preferably, there is employed sufficient sulfuric acid in this absorption step to absorb at least about 80, most preferably at least about 90, percent of the HF in the overhead stream from the separation zone. Much less sulfuric acid is required to accomplish this than is needed to dehydrate the fluosilicic acid as described above. Thus, for example, of the total amount of concentrated sulfuric acid used in the two steps, usually only about 1 to 10, e.g., about 5, percent will be used in the HF absorption step. The spent sulfuric acid obtained from the absorption step will often contain about 2 to 40, usually about 10 to 20, weight percent of dissolved HF.

The HF-containing sulfuric acid from the above absorption step is then conducted to a desorption zone wherein it is heated to a temperature sufficient to liberate gaseous hydrogen fluoride therefrom but below the boiling point of the solution in the zone; often, for example, a temperature of about 200° to 300°F. will be suitable, especially at approximately atmospheric pressure. The HF which is recovered thereby can be about 98 to 99 percent pure. To purify it further, say to about 99.8 percent purity, it can be condensed, distilled, and recondensed. An advantage of rectifying the HF at this point in the process rather than condensing the HF while admixed with the $SiF_4$ in the overhead from the separation zone is that 98 percent pure HF condenses at about 68°F. at atmospheric pressure, whereas the $HF/SiF_4$ overhead mixture would have to be cooled to, say, about minus 55°F. in order to condense the HF therefrom.

As stated above, the production of relatively dry or concentrated silicon tetrafluoride, e.g., having a concentration of at least about 90 weight percent, in accordance with this invention affords a concentrated fluosilicic acid stream needed for mixing with the strong sulfuric acid. Thus the source or make-up fluosilicic acid is usually available in relatively dilute forms and the $SiF_4$ remaining after the absorption of HF from the separation zone overhead and that made by treatment of the separator bottoms with silica can be used to produce the concentrated fluosilicic acid. In a general sense the vaporous $SiF_4$ is conducted to a hydration zone wherein it is reacted with water to yield a slurry of silica in fluosilicic acid. When this water is in a dilute fluosilicic acid stream this reaction serves to concentrate the fluosilicic acid as aforedescribed. In any event the fluosilicic acid can be separated from the silica, for example, by centrifugation, filtration or decantation, the fluosilicic acid used for mixing with the sulfuric acid. A portion of the silica can, if desired, by used in the defluorination, discussed above, of the diluted sulfuric acid bottoms obtained from the separation zone. The hydration zone can be supplied by any suitable gas-liquid contacting vessel as, for example, one or more spray towers.

The process can be more readily described by reference to the drawing which sets forth a flowsheet illustrating a preferred embodiment of an integrated producing for sproducing HF. Referring to the drawing, fluosilicic acid, at a temperature of about 200°F. and a concentration of about 36 weight percent $H_2SiF_6$, is carried in line 14 to mixing tee 27 where it is combined with 98 percent sulfuric acid introduced via line 2, heater 28 and line 24, also at a temperature of about 200°F. The weight ratio (anhydrous) of sulfuric acid to fluosilicic acid in the mixture is about 16 to 1. The mixture of acids is conducted via line 23 under about 10 p.s.i.g. pressure to the separator, which is a falling film type of evaporator. Residence time in line 23 is about 5 seconds and the mixture enters the evaporator at about 250°F., which is approximately the temperature of the liquid in the evaporator. $SiF_4$ and HF gases flash off under the approximately atmospheric pressure conditions maintained in the evaporator and are removed via line 15. Diluted sulfuric acid (about 80 weight percent concentration) is withdrawn as bottoms via line 3. Residence time of the reactants in the evaporator is about 2 to 5 minutes.

The gaseous overhead in line 15 is passed through the HF absorber in countercurrent contact with 98 percent sulfuric acid supplied by line 25 at about 100°F. The absorber may, for example, have one or a plurality of stages arranged in series to provide for overall countercurrent flow of the gases and sulfuric acid. An especially suitable absorption system uses three packed scrubbers in series. $SiF_4$ vapors pass unabsorbed through the absorber and exit via line 17. HF-containing sulfuric acid (having an HF concentration of about 38 weight percent) exits the bottom of the absorber and passes through line 16 to the HF desorber, e.g., a stripping column, where it is heated to about 250°F. under atmospheric pressure conditions. Relatively pure, anhydrous HF gas is liberated from the desorber and passes via line 18 to No. I condenser wherein it is cooled and condensed. Liquid HF passes through line 20 to the rectifier where it is distilled. The HF vapors from the rectifier are recondensed in No. II condenser and removed from the system via line 4. $SiF_4$ vapors which are uncondensed in the No. I condenser are routed via line 19 to No. I scrubber, described below. Rectifier bottoms are recycled through line 22 back to the separator. Likewise, the sulfuric acid bottoms (about 98 weight percent concentration) from the HF desorber are recycled via line 21 to the separator.

Make-up fluosilicic acid for the system, for example, having a concentration of about 25 weight percent $H_2SiF_6$, enters via line 1 and is used as scrubbing liquid in No. I scrubber to absorb the $SiF_4$ vapors carried to the scrubber via line 19. The spent scrubbing liquid from No. I scrubber, which can contain suspended silica from the reaction with $SiF_4$, is carried via line 6 to No. II scrubber where it is used to scrub the $SiF_4$ vapors passing overhead from the HF absorber via line 17 and concentrate the fluosilicic acid feed. The resulting slurry of silica in fluosilicic acid is withdrawn from No. II scrubber via line 7 and sent to the filter. A portion of the first cut of the filtrate, withdrawn from the filter via line 8, is passed through line 12 to the preheater wherein it is heated to about 200°F. Material which is vaporized in the preheater is recycled via line 13 to be scrubbed with the other gases in No. II scrubber. The heated liquid from the preheater is fluosilicic acid of about 36 weight percent concentration. It is carried via line 14 to mixing tee 27.

Water enters the system via line 5 and is used to wash the silica filter cake. The second cut of filtrate, which is withdrawn from the filter via line 9, is combined with a portion of the first cut, taken via line 10, and the combined stream is recycled in line 11 back to No. I scrubber where it is combined with the make-up fluosilicic acid for use as the scrubbing liquid. Washed silica is withdrawn from the system via line 26.

In an optional embodiment, shown by broken lines in the drawing, a portion of the silica product stream is withdrawn via line 29 and introduced into a defluorinator, which is an agitated mixing vessel operated under ambient conditions. In the defluorinator, the silica is dispersed in the sulfuric acid bottoms from the separator, thus converting any HF present in the bottoms to water and gaseous $SiF_4$, which is liberated from the defluorinator and passed via line 30 to the $SiF_4$ stream in line 17.

The process of the present invention can provide several additional advantageous features. For instance, premixing the fluosilicic acid and the sulfuric acid under pressure and exposing discrete increments of the resulting admixture to othe lower pressure atmosphere in the separator provides for a maximum release of HF and $SiF_4$ in a minimum of residence time in the separator, e.g., about 2–5 minutes, compared with a residence time of, for example, about 90 minutes when introducing each of the reactants separately into a batch-type dehydrator. The significance of this can be readily appreciated in that either a separator having a smaller volume, e.g., compared to a batch-type dehydrator, can be used to provide a given production of HF or $SiF_4$, or a separator of about the same volume can be used to provide a significant increase in the production of HF, thus resulting in a significant savings in the capital investment required for the dehydrator.

Another advantageous feature is provided by the use of a small, additional increment of $H_2SO_4$ to contact, and absorb HF from the HF/$SiF_4$ gas mixture in the HF absorber. The use of such small amounts, e.g., the minimum required, provides efficient absorption of the HF, economical cooling of the absorber contents, a concentrated HF-containing $H_2SO_4$ product for the HF desorber, and economical heating of the concentrated HF-containing $H_2SO_4$ in the desorber to efficiently produce relatively pure anhydrous HF gas.

The economy in cooling and heating is a result of using the minimum amount of $H_2SO_4$ to absorb HF. For instance, by following the present process under given conditions, about 3,000 pounds of $H_2SO_4$/HF-$SiF_4$ are cooled in the HF absorber and even less is heated in the desorber, rather than cooling about 59,000 pounds of material to hold the HF and then heating the bulk to produce HF. Thus, by using a minimum amount of $H_2SO_4$ to absorb and desorb, equipment having smaller capacity can be used, and the utility, e.g., cooling water and steam, requirements are significantly reduced.

The following material balance table will provide another specific example of an integrated system, giving compositions of the steams for the various flow lines and prevailing temperatures. The conditions and material balance given in the table are for the process as set forth in the drawings, with the following exceptions: In contrast to the drawings, heater 28 is not used but, rather, the concentrated sulfuric acid enters the system via line 2 at about 210°F.; also, there is no provision for the defluorination system indicated in the drawings with broken lines.

TABLE

PROCESS CONDITIONS

| | |
|---|---|
| Wt. fraction HF in bottom of rectifier | 0.38 |
| Wt. fraction of $H_2SO_4$ in sulfuric acid feed | 0.98 |
| Wt. fraction of $H_2SO_4$ in diluted sulfuric acid | 0.80 |
| Wt. fraction of $SiO_2$ in filter feed | 0.02 |
| Wt. fraction $SiO_2$ in filter cake | 0.15 |
| Wt. fraction fluosilicic acid lost in filter cake | 0.01 |
| Wt. fraction water in filter cake | 0.84 |
| Wt. fraction fluosilicic acid in feed to preheater | 0.36 |
| Efficiency of HF absorber | 0.96 |
| Temperature of absorber, Deg. F. | 100 |
| Temperature of No. I condenser, Deg. F. | 35 |
| Temperature of HF desorber, Deg. F. | 250 |
| Temperature of sulfuric acid feed, Deg. F. | 210 |
| Temperature of preheater, Deg. F. | 205 |
| Wt. fraction fluosilicic acid in make-up feed | 0.25 |
| Total wt. of fluosilicic acid in feed, lbs. | 10,000 |

MATERIAL BALANCE, WT. OF STREAM IN POUNDS

| Line No. | Water | HF | $SiF_4$ | $H_2SO_4$ | $SiO_2$ | Total | Temperature (° F.) |
|---|---|---|---|---|---|---|---|
| 1 | 7,499 | 694 | 1,805 | | | 9,999 | |
| 2 | 1,103 | | | 54,053 | | 55,156 | 210 |
| 3 | 14,616 | 683 | | 54,053 | | 69,353 | 279 |
| 4 | | 1,344 | | | | 1,344 | |
| 5 | 12,296 | | | | | 12,296 | |
| 6 | 32,388 | 3,555 | 9,182 | | | 45,126 | |
| 7 | 31,780 | 4,965 | 12,912 | | 1,013 | 50,670 | |
| 11 | 24,888 | 2,835 | 7,372 | | | 35,096 | |
| 12 | 13,513 | 2,111 | 5,489 | | | 21,114 | |
| 14 | 13,513 | 2,111 | 5,489 | | | 21,114 | 205 |
| 15 | 245 | 1,468 | 5,489 | | | 7,203 | 279 |
| 16 | 284 | 1,409 | 4 | 1,915 | | 3,614 | 100 |
| 17 | | 58 | 5,485 | | | 5,543 | 100 |
| 18 | 17 | 1,376 | 4 | | | 1,399 | 250 |
| 19 | | 25 | 4 | | | 30 | 35 |
| 20 | 17 | 1,350 | | | | 1,368 | 35 |
| 21 | 266 | 33 | | 1,915 | | 2,215 | 250 |
| 22 | 17 | 6 | | | | 24 | |
| 23 | 14,577 | 2,111 | 5,480 | 52,138 | | 74,316 | 279 |
| 24 | 1,064 | | | 52,138 | | 53,202 | 210 |
| 25 | 39 | | | 1,915 | | 1,954 | 210 |
| 26 | 5,675 | 18 | 48 | | 1,013 | 6,756 | |

It is claimed:

1. A process for producing anhydrous hydrogen fluoride from fluosilicic acid comprising
   i. mixing in a reaction zone having essentially no vapor space, liquid sulfuric acid having a concentration of at least about 93 weight percent with liquid, essentially silica-free, aqueous fluosilicic acid having a concentration of at least about 25 weight percent $H_2SiF_6$ to effect dehydration of the fluosilicic acid and dilution of the sulfuric acid,
   ii. maintaining the mixture in said reaction zone under superatmospheric pressure for a time sufficient to allow the temperature of this mixture to reach at least about 220°F., said steps (i) and (ii) serving to minimize the formation of silica,
   iii. introducing the mixture into a reduced pressure separation zone from whence hydrogen fluoride and silicon tetrafluoride are evolved as gaseous overhead and diluted sulfuric acid is withdrawn as liquid bottoms, the temperature of the liquid in said zone being maintained at at least about 200°F.,
   iv. contacting said gaseous overhead with liquid sulfuric acid having a concentration of at least about 93 weight percent and a temperature up to about 120°F. to selectively absorb the hydrogen fluoride from said overhead and yield a liquid solution of hydrogen fluoride in sulfuric acid, and
   v. conducting said solution of hydrogen fluoride in sulfuric acid to a desorption zone wherein the solution is heated to a temperature sufficient to liberate gaseous hydrogen fluoride therefrom but below the boiling point of the solution in the zone.

2. The process of claim 1 wherein silicon tetrafluoride that is unabsorbed in step (iv) is reacted with water to yield a slurry of silica in fluosilicic acid, the fluosilicic acid is separated from the silica and separated fluosilicic acid is used in step (i).

3. The process of claim 2 wherein the water is supplied as dilute fluosilicic acid and the hydration serves to concentrate the fluosilicic acid for use in step (i).

4. The process of claim 3 wherein the dilute fluosilicic acid has a concentration of about 10 to 25 weight percent and the concentrated fluosilicic acid has a concentration of about 30 to 50 weight percent.

5. The process of claim 4 wherein the sulfuric acid is mixed with the fluosilicic acid in step (i) in an anhydrous weight ratio of about 10 to 30:1 and sufficient to provide the diluted sulfuric acid in step (iii) with a concentration of about 65 to 90 weight percent.

6. The process of claim 5 wherein in step (i), prior to the mixing, the sulfuric acid is at a temperature of about 100° to 250°F. and the fluosilicic acid is at a temperature of about 100 to 240°F.

7. The process of claim 1 wherein the diluted sulfuric acid in step (iii) is contacted with silica in a defluorination zone at a temperature below the boiling point of the sulfuric acid in the zone but sufficient to convert hydrogen fluoride present in the acid to water and silicon tetrafluoride and to evaporate the silicon tetrafluoride from the acid, thereby reducing the fluorine content of the diluted sulfuric acid.

8. The process of claim 1 wherein the hydrogen fluoride liberated is further purified by subjecting it to condensation, distillation, and recondensation.

9. The process of claim 1 wherein the pressure maintained in step (ii) is at least about 5 pounds per square inch gauge.

10. The process of claim 1 wherein the sulfuric acid employed in step (i) has a concentration of about 98 to 99 weight percent.

11. The process of claim 1 wherein, in step (ii), the mixture is maintained under the pressure for a time sufficient to allow the temperature of the mixture to reach at least about the temperature of the liquid in the reduced pressure separation zone.

12. The process of claim 1 wherein the temperature of the liquid in the reduced pressure separation zone is maintained at at least about 250°F.

13. The process of claim 1 wherein the liquid sulfuric acid employed in step (iv) has a temperature of about 90° to 100°F.

14. The process of claim 1 wherein, in step (iv), the overhead is contacted with sufficient sulfuric acid to absorb at least about 90 percent of the hydrogen fluoride in the overhead.

15. The process of claim 1 wherein the desorption zone temperature is about 200° to 300°F.

16. The process of claim 1 wherein the sulfuric acid is mixed with the fluosilicic acid in step (i) in an anhydrous weight ratio of about 15 to 20:1 and sufficient to provide the diluted sulfuric acid in step (iii) with a concentration of about 75 to 85 weight percent.

17. The process of claim 1 wherein the pressure maintained in step (ii) is at least about 10 pounds per square inch gauge.

18. The process of claim 1 wherein, in step (ii), the mixture is maintained under the pressure for about 0.1 to 10 seconds.

19. The process of claim 1 wherein, in step (iii), the mixture in the separation zone is sufficiently dispersed that it has at least about 20 square centimeters of liquid-gas interface per cubic centimeter of liquid.

20. The process of claim 19 wherein, in step (iii), the mixture has a residence time in the separation zone of about 0.1 to 20 minutes.

21. The process of claim 1 wherein, in step (iii), the mixture has a residence time in the separation zone of about 0.5 to 5 minutes and is sufficiently dispersed in the zone that it has at least about 20 square centimeters of liquid-gas interface per cubic centimeter of liquid.

22. The process of claim 1 wherein, in step (i), the sulfuric acid has a concentration of about 93 to 99 weight percent and the fluosilicic acid has a composition ranging from about 25 weight percent $H_2SiF_6$ and about 75 weight percent water up to the azeotropic mixture of about 10 weight percent hydrogen fluoride, about 36 weight percent $H_2SiF_6$ and about 54 weight percent water.

23. A process for producing anhydrous hydrogen fluoride from fluosilicic acid comprising i. mixing in a flow line in a manner providing essentially no vapor space, liquid sulfuric acid having a concentration of about 93 to 99 weight percent with liquid, essentially silica-free fluosilicic acid having a composition ranging from about 25 weight percent $H_2SiF_6$ and about 75 weight percent water up to the azeotropic mixture of about 10 weight percent hydrogen fluoride, about 36 weight percent $H_2SiF_6$ and about 54 weight percent water to effect dehydration of the fluosilicic acid and dilution of the sulfuric acid, ii. maintaining the mixture in said flow line under a pressure of at least 10 pounds per square inch gauge for at least about 0.1 second, said time being sufficient to allow the temperature of the mixture to reach at least about 220°F., said steps (i) and (ii) serving to minimize the formation of silica, iii. introducing the mixture from said flow line into a reduced pressure separation zone from whence a mixture of hydrogen fluoride and silicon tetrafluoride is evolved as gaseous overhead and diluted sulfuric acid is withdrawn as liquid bottoms, the temperature of the liquid in said zone being maintained at at least about 200°F., and below the boiling point of the sulfuric acid present, iv. contacting said gaseous overhead with liquid sulfuric acid having a concentration of about 93 to 99 weight percent and a temperature up to about 120°F. to selectively absorb the hydrogen fluoride from said overhead and yield a liquid solution of hydrogen fluoride in sulfuric acid, and v. conducting said solution of hydrogen fluoride in sulfuric acid to a desorption zone wherein the solution is heated to a temperature sufficient to liberate gaseous hydrogen fluoride therefrom but below the boiling point of the solution in the zone.

24. The process of claim 24 wherein, in step (ii), the mixture is maintained under the pressure for about 0.1 to 10 seconds.

25. The process of claim 25 wherein, in step (iii), the mixture has a residence time in the separation zone of about 0.1 to 5 minutes.

* * * * *

UNITED STATES PATENT OFFICE
CERTIFICATE OF CORRECTION

Patent No. 3,758,674         Dated September 11, 1973

Inventor(s) WILLIAM R. PARISH, et al.

It is certified that error appears in the above-identified patent and that said Letters Patent are hereby corrected as shown below:

IN THE CLAIMS:

Column 10 - Claim 24, change the dependency of this claim from "24" to --23--.

Column 10 - Claim 25, change the dependency of this claim from "25" to --24--.

Signed and sealed this 10th day of September 1974.

(SEAL)
Attest:

McCOY M. GIBSON, JR.         C. MARSHALL DANN
Attesting Officer           Commissioner of Patents